(12) United States Patent
Zeh

(10) Patent No.: US 6,636,013 B2
(45) Date of Patent: Oct. 21, 2003

(54) METHOD OF RAPIDLY STARTING AN ASYNCHRONOUS MOTOR

(75) Inventor: Stefan Zeh, Wangen (DE)

(73) Assignee: Diehl AKO Stiftung & Co. KG, Wangen (DE)

( * ) Notice: Subject to any disclaimer, the term of this patent is extended or adjusted under 35 U.S.C. 154(b) by 0 days.

(21) Appl. No.: 10/050,323

(22) Filed: Jan. 16, 2002

(65) Prior Publication Data

US 2002/0093305 A1 Jul. 18, 2002

(30) Foreign Application Priority Data

Jan. 18, 2001 (DE) ......................................... 101 02 117

(51) Int. Cl.$^7$ .............................................. H02P 1/24
(52) U.S. Cl. ..................... 318/727; 318/767; 318/768; 318/778; 318/801; 318/812; 318/825
(58) Field of Search ................. 318/727, 767, 318/768, 778, 798, 800, 801, 812, 825

(56) References Cited

U.S. PATENT DOCUMENTS

| | | | | |
|---|---|---|---|---|
| 4,088,934 A | * | 5/1978 | D'Atre et al. | 318/227 |
| 5,440,219 A | * | 8/1995 | Wilkerson | 318/802 |
| 5,929,612 A | * | 7/1999 | Eisenhaure et al. | 322/47 |
| 5,969,497 A | | 10/1999 | McDonald et al. | |
| 6,121,740 A | * | 9/2000 | Gale et al. | 318/376 |

FOREIGN PATENT DOCUMENTS

JP 54105714 A 8/1979

OTHER PUBLICATIONS

"Digitale Steuerung eines Dreiphasen–Induktionsmotors" Design and Elecktronik, vol. 8, Apr. 7, 1992, pp. 40, 41, 42 and 46.

* cited by examiner

Primary Examiner—Bentsu Ro
Assistant Examiner—Rina I. Duda
(74) Attorney, Agent, or Firm—Scully, Scott, Murphy & Presser

(57) ABSTRACT

In order to accelerate an asynchronous motor with a squirrel-cage rotor even under load extremely quickly, and in particular within the time of an electromagnetic rotor time constant, in order to be able to cause it to start with a so-called kick start, while the rotor is not moving, quasi-stationary magnetic conditions are initially produced, like at the start of a synchronous motor with a permanent-magnetic rotor. For that purpose there is briefly produced a high-frequency rotor induction current which occurs electrically and spatially in a quasi-stationary condition when thereupon still within the rotor time constant, a strong unmoving stator magnetic field is produced, with a stator current vector which is displaced through about 90° for an optimum starting torque in relation to the rotor current vector, whereupon the stator rotary field starts with increasing amplitude and frequency.

9 Claims, 1 Drawing Sheet

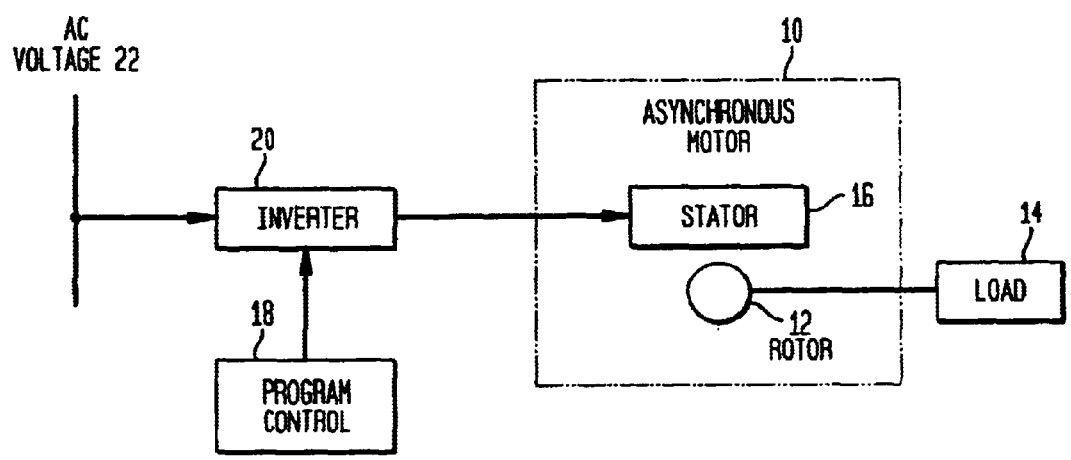
FIG.

METHOD OF RAPIDLY STARTING AN ASYNCHRONOUS MOTOR

BACKGROUND OF THE INVENTION

1. Field of the Invention

The present invention relates to a method for the rapid starting of an asynchronous motor having a squirrel-cage rotor under load at an accelerated build-up of a motor torque through premagnetization.

2. Discussion of the Prior Art

A method of generally this type is known from the disclosure of U.S. Pat. No. 5,969,497 as a starting circuit for the rapid start (referred to as "Kick-Start") of an asynchronous induction motor which is operated from a single-phase AC-voltage network at a fixed voltage and fixed frequency in three-phase mode in a delta-connection, and is based therein on a controlled discharge of an additionally provided capacitive storage means for the direct-current premagnetization of at least one stator winding. The foregoing is; however, extremely expensive in the provision of the required circuitry. In any event, at the beginning of operation the capacitor has to be initially charged, which hinders the earliest possible employment of such a premagnetization. Moreover, the capacitor discharge into an inductive consumer with an iron core does not deliver any great differential quotient of the current cycle over time, and consequently does not provide a high induction effect on the rotor, so that just at the commencement of the rotor motion, this auxiliary starting measure provides only a relatively negligible contribution to the starting behavior of the motor, the magnetic time constant of which thus determines the time-delayed coming into effect of this auxiliary starting behavior. A further disadvantage in this respect is that, when the mains voltage is switched on at fixed frequency, the premagnetization is not field-oriented in relation to the rotating motor field. Such pre-magnetization which rotates in an unsynchronized manner therefore leads to a fluctuating torque precisely during the operationally critical start-up phase of the loaded asynchronous motor, and thus leads to an unstable operating behavior similar to that of asynchronous motor with a permanent-magnetic rotor, which has fallen out of step, that being harmful to the desired acceleration of the a synchronous motor in a manner which is extremely fast even under load; however, while being kinematically stable.

SUMMARY OF THE INVENTION

Accordingly, it is a primary object of the invention to be able to effect a defined and especially, an extremely fast acceleration of the asynchronous motor even under load from standstill to its rated speed of rotation within the magnetic rotor time constant.

In accordance with the present invention, the foregoing object is attained in that, through the intermediary of a program-controlled inverter, the stator has a magnetic field impressed thereon while the motor is still stopped, wherein the magnetic field changes over time and builds up an induction current in the rotor, whereupon a stator current is then immediately impressed and which possesses a spatial vector oriented approximately perpendicularly to a still quasi-stationarily occurring vector of the rotor current, so as to finally at the commencement of rotor motion cause the start of stator rotary field at an increasing frequency and amplitude.

In accordance with the foregoing, operation of the polyphase induction or asynchronous motor with short-circuited rotor in the form of a squirrel-cage rotor with an abruptly starting high start-up torque is no longer supplied from an AC-voltage network at fixed amplitude and supplied frequency, but in a manner which is known as such from a DC-voltage source by means of a controlled inverter with a pulse-modulated polyphase full-inverted bridge circuit for feeding the stator windings of the motor with a frequency and amplitude which can be varied in virtually any fashion. An example of such an inverter is described in the article 'Digitale Steuerung eines Dreiphasen-lnduktionsmotors' ['Digital Control of a Three-phase Induction Motor] by B. Maurice et al., in Design & Elektronik, Issue 8/92 of Apr. 7, 1992, pages 40 to 46.

BRIEF DESCRIPTION OF THE DRAWING

The FIGURE is a block diagram illustrating the present invention for a method for rapidly starting an asynchronous motor possessing a squirrel-cage rotor driving a load through accelerated build-up of a motor torque by premagnetization.

DETAILED DESCRIPTION OF PREFERRED EMBODIMENTS

Referring to the FIGURE, the present invention provides a method for rapidly starting an asynchronous motor 10 possessing a squirrel-cage rotor 12 driving a load 14 through an accelerated build-up of a motor torque by premagnetization, comprising impressing a magnetic field on a stator 16 of the motor through a program-control 18 of an inverter 20, powered by an AC voltage 22, while the motor is at a standstill, with the magnetic field changing over time so as to build up an induction current in the rotor, thereupon immediately impressing a stator current, the stator current having a spatial vector which is oriented approximately perpendicularly to a presently quasi-stationarily occurring vector of the rotor current, so as to finally, commencing with the beginning of rotor motion, causing a stator field to start at an increasing frequency and amplitude.

At the beginning of operation of the asynchronous motor, first, when the rotor is still not moving, a rotor current is induced and then a stator current which is directed vectorially orthogonal with respect thereto is switched on in order to already have a high starting torque available when, thereafter, the magnetic rotating field produced by the stator starts at a steadily increasing frequency and causes the rotor to rotate.

There are various possible options which can be implemented in accordance with the invention for initially inducing a rotor current which is as high as possible while the rotor is still not moving.

Thus, with a stator voltage which is rotating in space, at high frequency and amplitude, after just a few revolutions, there is in the rotor a heavily pronounced rotor current, while in the meantime the induction motor is in the so-called stalled condition during which it produces only a low level of torque.

On the other hand, if the inverter supplies DC-voltage to a stator winding, then due to the increasing stator current there is generated a magnetic field which is stationary in space but which increases over time, and which produces an equally increasing rotor current in the spatial plane. In that situation, the motor is still not generating any torque. When there is reached the maximum stator current, in effect the stationary stator current, is reached, that phase is concluded, and the DC-current feed to the stator winding is terminated.

In a development of that option, in connection therewith, a transition is desirably produced at the stator side from a positive to a negative maximum current (or vice-versa), in order to produce, at the limited maximum amplitude of the stator current, a monotonically increasing or monotonically decreasing stator current which is as high as possible. In this connection, the terms positive and negative are to be interpreted in spatial terms, since they relate to the spatial orientation of the magnetic field resulting from the stator current. A certain pump effect to increase the stator current is achieved if the described sequence of the two spatially oppositely oriented inductive magnetomotive forces in the stator winding is repeated a plurality of times. That pole-changing DC-voltage feed practically replaces a high-frequency feed for the stator, but it can also be used in the context of the present invention.

In the event of a direct-current excitation, in the stopped condition a DC-voltage of the maximum possible amplitude is therefore applied to at least one of the stator windings until the stator current, in accordance with the effective inductive time constant, has risen to at least approximately its static maximum, and immediately thereafter a (spatially) opposite stator voltage of lower amplitude is applied until the stator current has reached its maximum negative amplitude. This produces a steeply rising rotor current in the positive direction and thereupon a current in the negative direction, which drops off somewhat less steeply. Since the positive rise is steeper than the negative flank, the positive current rise is damped more extensively through the skin effect in the rotor conductors, so that the rotor current in the positive direction is initially not so intensely pronounced as the subsequent negative current and finally there is a strong rotor current with a negative spatial orientation.

Expediently, for the initial induction of a rotor current which is as high as possible, there is implemented a succession of at least two of the above-mentioned three possibilities. The rotor current from premagnetization attenuates away only slowly corresponding to the relatively great time constant of the rotor (which typically is in the order of magnitude of about 50 msec), and is therefore still quasi-stationary during the starting phase which immediately follows. As the torque of the motor is proportional to the vector product of the instantaneous rotor current and the instantaneous resulting rotor current, and therefore proportional to the product of the two vector lengths and the sine of the angle included between those vectors, the asynchronous motor now experiences an optimum starting moment for initiating the rotary movement of its rotor if the impressed stator current is spatially displaced through 90° with respect to the rotor current which, as described, was made available through premagnetization. The stator magnetomotive force can now be converted into spatial rotary movement in a pre-programmed manner with increasing amplitude and frequency, in order to accelerate the rotor extremely quickly and stably from stop to rated rotary speed, in spite of the rotor load moment. That program-controlled rise in frequency and amplitude of the stator magnetomotive force is predetermined, having regard to the motor rating and the known load moment, in such a way that the vector angle present between or sublended by the stator current and the rotor current is approximately 60° but at any event always greater than 0° and always less than 90°, because that affords a self-stabilizing motor torque, notwithstanding the extremely fast start under load from the standstill condition. In the situation involving a loading on the motor with a rotary speed-dependent load torque, it is desirable, in any event, to vary the frequency and possibly also the amplitude of the stator current in a correspondingly rotary speed-dependent manner.

In accordance with an advantageous development of the features pursuant to the invention it may be desirable, at the beginning of operation, to repeat at least once again the extremely short-term high-frequency premagnetization effect when the rotor is stopped, in order to still further increase the effective rotor current as a consequence of the superimposition of induction currents which occur in succession in an in-phase relationship; however, without having to design the inverter for a correspondingly high peak current loading. However, that increase in the still quasi-stationary rotor induction current can also be easily implemented by the previously described application, in the correct phase relationship, of the stator DC-voltage with a stator voltage vector which is directed in opposite relationship to the rotor current, immediately prior to starting the rotary field.

In order to extremely rapidly accelerate an asynchronous motor with a squirrel-cage rotor even under load, and in particular while still within the period of the electromagnetic rotor time constant, in effect, in order to be able to cause it to start with a so-called "Kick Start" effect, therefore, in accordance with the invention, while the rotor is still stationary, initially there are produced quasi-stationary static magnetic conditions as at the start of a rotary field synchronous motor with a permanent-magnetic rotor. For that purpose, within the rotor time constant, there is briefly produced a very high-frequency rotor induction current which still occurs electrically and spatially in a quasi-stationary condition, when subsequently, also still within the rotor time constant there is produced-a strong steady field stator magnetomotive force, with a stator current vector which is displaced through an angle of about 90° for an optimum starting torque in relation to the rotor current vector, whereupon the stator rotary field starts with an increasing amplitude and frequency. Thus, the induction motor is started by means of a stator current which is controlled by way of the inverter, without requiring any rotary speed sensors, rotary angle sensors or current sensors for reporting back the operating conditions for a start-up regulation.

What is claimed is:

1. A method for rapidly starting an asynchronous motor possessing a squirrel-cage rotor under load through an accelerated build-up of a motor torque by premagnetization, comprising impressing a magnetic field on a stator of the motor through a program-controlled inverter while the motor is at a standstill, said magnetic field changing over time so as to build up an induction current in the rotor, thereupon immediately impressing a stator current, said stator current having a spatial vector which is oriented substantially perpendicularly to a presently quasi-stationarily occurring vector of the rotor current, so as to finally, commencing with the beginning of a rotor motion, causing a stator rotary field to start at an increasing frequency and amplitude.

2. A method according to claim 1, wherein in order to produce the stator magnetic field which changes over time, there is applied a DC-voltage to the stator until the stator current has risen to approximately a predetermined maximum value.

3. A method according to claim 1 or 2, wherein in order to produce the stator magnetic field which changes over time, there is applied a DC-voltage of high amplitude and directly thereafter a DC-voltage of lower amplitude to the stator with a spatially opposite orientation to the stator.

4. A method according to claim 3, wherein the voltage sequence for the two stator magnetic fields is repeated a plurality of times.

5. A method according to claim 1, wherein the stator is fed with a stator current spatially rotating at a high frequency.

6. A method according to claim 4, wherein the stator is fed with a stator current spatially rotating at a high frequency.

7. A method according to claim 3, wherein the stator is fed with a stator current spatially rotating at a high frequency.

8. A method according to claim 1, wherein upon the start of a rotational movement, the stator rotary field is accelerated as a predetermined function of time which is dependent upon the motor torque.

9. A method according to claim 1, wherein a steady field premagnetization effect which follows at least one high-frequency premagnetization is exerted by a resulting voltage vector which is directed in an opposite direction to the vector of the previously induced rotor current.

* * * * *